(12) United States Patent
Ozdemir et al.

(10) Patent No.: US 8,639,442 B2
(45) Date of Patent: Jan. 28, 2014

(54) IDENTIFYING INVALID SEISMIC DATA

(75) Inventors: Ahmet Kemal Ozdemir, Asker (NO);
Bent Andreas Kjellesvig, Oslo (NO)

(73) Assignee: WesternGeco L.L.C., Houston, TX (US)

(*) Notice: Subject to any disclaimer, the term of this patent is extended or adjusted under 35 U.S.C. 154(b) by 264 days.

(21) Appl. No.: 13/167,833

(22) Filed: Jun. 24, 2011

(65) Prior Publication Data
US 2012/0130643 A1 May 24, 2012

Related U.S. Application Data

(60) Provisional application No. 61/416,647, filed on Nov. 23, 2010.

(51) Int. Cl.
*G01V 1/00* (2006.01)
*G01V 1/38* (2006.01)
*G01P 13/00* (2006.01)

(52) U.S. Cl.
USPC ............................. 702/14; 367/21; 73/170.33

(58) Field of Classification Search
USPC ............... 702/14, 1–2, 16–17, 81, 84–85, 90, 702/127, 138, 179, 189–191, 193–195, 702/198–199; 73/170.29, 170.33; 367/15, 367/20–22, 141, 144, 153–154
See application file for complete search history.

(56) References Cited

U.S. PATENT DOCUMENTS

| | | | |
|---|---|---|---|
| 6,883,638 B1 | 4/2005 | Maxwell et al. | |
| 6,901,028 B2 * | 5/2005 | Clayton et al. | 367/68 |
| 7,085,675 B2 | 8/2006 | Wegerich | |
| 2008/0151688 A1 | 6/2008 | Goujon | |
| 2008/0270035 A1 | 10/2008 | Ozdemir et al. | |
| 2009/0046536 A1 | 2/2009 | Kinkead | |

OTHER PUBLICATIONS

International Search Report and Written Opinion issued in PCT/US2011/061100 on Jun. 11, 2012, 8 pages.

* cited by examiner

*Primary Examiner* — Toan Le

(57) ABSTRACT

A method for processing seismic data. The method may include (1) receiving seismic data acquired by an $i^{th}$ seismic sensor of a plurality of seismic sensors and (2) determining an $i^{th}$ value to represent an $i^{th}$ power spectral density curve that corresponds to the seismic data. The method may then repeat steps (1)-(2) for each seismic sensor. The method may then include generating an expected value curve based on the $i^{th}$ value for each power spectral density curve. The method may then compare each $i^{th}$ value to the expected value curve and identify invalid seismic sensors based on the comparison. After identifying the invalid seismic sensors, the method may process the seismic data without seismic data acquired by the invalid seismic sensors to determine one or more locations of hydrocarbon deposits in subterranean geological formations.

24 Claims, 5 Drawing Sheets

IDENTIFYING INVALID SEISMIC DATA

CROSS-REFERENCE TO RELATED APPLICATIONS

This application claims benefit of U.S. provisional patent application Ser. No. 61/416,647, titled, METHOD FOR ACCELEROMETER QC DURING SEISMIC ACQUISITION, filed Nov. 23, 2010, which is incorporated herein by reference.

BACKGROUND OF THE INVENTION

1. Field of the Invention

Implementations of various technologies described herein generally relate to seismic data processing. In particular, various technologies described herein relate to a method for correcting invalid seismic data acquired by problematic seismic sensors.

2. Description of the Related Art

Seismic surveying is a method for determining the structure of subterranean formations in the earth. Seismic surveying typically utilizes seismic energy sources which generate seismic waves and seismic sensors which detect seismic waves. Both the sources and sensors may be strategically repositioned to cover the survey area.

The seismic energy sources may propagate seismic waves into the formations in the earth, where a portion of the waves reflects from interfaces between subterranean formations. The seismic sensors detect the reflected seismic waves and convert the reflected waves into representative electrical signals. The signals are typically transmitted by electrical, optical, radio or other means to devices which record the signals. Through analysis of the recorded signals (or traces), the shape, position and composition of the subterranean formations can be determined.

The seismic sensors may be disposed on a conventional seismic streamer. A conventional seismic streamer is typically several kilometers in length and consists of thousands of seismic sensors. During a seismic survey, some of the seismic sensors may fail or may be more sensitive to noise than other seismic sensors along the streamer. In order to accurately process all of the seismic data acquired from all of the seismic sensors in a seismic survey, the seismic data acquired by the failed seismic sensors and noise-sensitive seismic sensors may be muted and interpolated before the seismic data is analyzed. However, due to the large number of seismic sensors, it is difficult to identify the seismic data that have been acquired by the failed or noise-sensitive seismic sensors.

SUMMARY OF THE INVENTION

Described herein are implementations of various technologies of a method for correcting invalid seismic data acquired by problematic seismic sensors. In one implementation, the method may include: (1) receiving seismic data acquired by an $i^{th}$ seismic sensor of a plurality of seismic sensors; and (2) determining an $i^{th}$ value to represent an $i^{th}$ power spectral density curve that corresponds to the seismic data. The method may then repeat steps (1)-(2) for each seismic sensor. After repeating steps (1)-(2) for each seismic sensor, the method may include generating an expected value curve based on the $i^{th}$ value for each power spectral density curve. The method may then compare each $i^{th}$ value to the expected value curve and identify invalid seismic sensors based on the comparison. After identifying the invalid seismic sensors, the method may process the seismic data without seismic data acquired by the invalid seismic sensors to determine one or more locations of hydrocarbon deposits in subterranean geological formations.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief summary of various technologies and techniques directed at correcting invalid seismic data acquired by problematic seismic sensors in accordance with one or more implementations described herein.

In one implementation, a computer application may generate a power spectral density (PSD) curve based on seismic data acquired by each seismic sensor in a seismic survey. The PSD curve may be generated by calculating the PSD of the seismic data acquired by each seismic sensor at a plurality of frequencies in a pre-selected frequency band.

After generating each PSD curve, the computer application may represent each PSD curve with a single value. For example, the computer application may determine a maximum PSD value for each PSD curve. The computer application may use each maximum PSD value to generate a collection of maximum PSD values that corresponds to the maximum PSD values of all of the seismic sensors. The computer application may then apply an outlier filter to the collection of maximum PSD values to remove the outlier values from the collection. Outlier values may include data that have extreme maximum values as compared to a relative distribution of the collection of maximum PSD values.

After applying the outlier filter, the computer application may apply a spatial smoothing filter to the filtered collection of maximum PSD values to create an expected maximum PSD value curve for the seismic sensors in the seismic survey. Using the expected maximum PSD value curve, the computer application may determine threshold curves. For instance, the upper threshold may be calculated by multiplying the expected maximum PSD value curve by a predefined constant A (e.g., A=10). Similarly, the lower threshold may be calculated by multiplying the expected maximum PSD value curve by a predefined constant B (e.g., B=0.1). If the maximum PSD value of a PSD curve is greater than the upper threshold, then the seismic sensor that corresponds to the maximum PSD value may be characterized as noisy. If, however, the maximum PSD value of a PSD curve is less than the lower threshold, then the seismic sensor that corresponds to the maximum PSD value may be characterized as weak or dead.

Various techniques for correcting invalid seismic data acquired by problematic seismic sensors will now be described in more detail with reference to FIGS. 1-5 in the following paragraphs.

Figure 1:
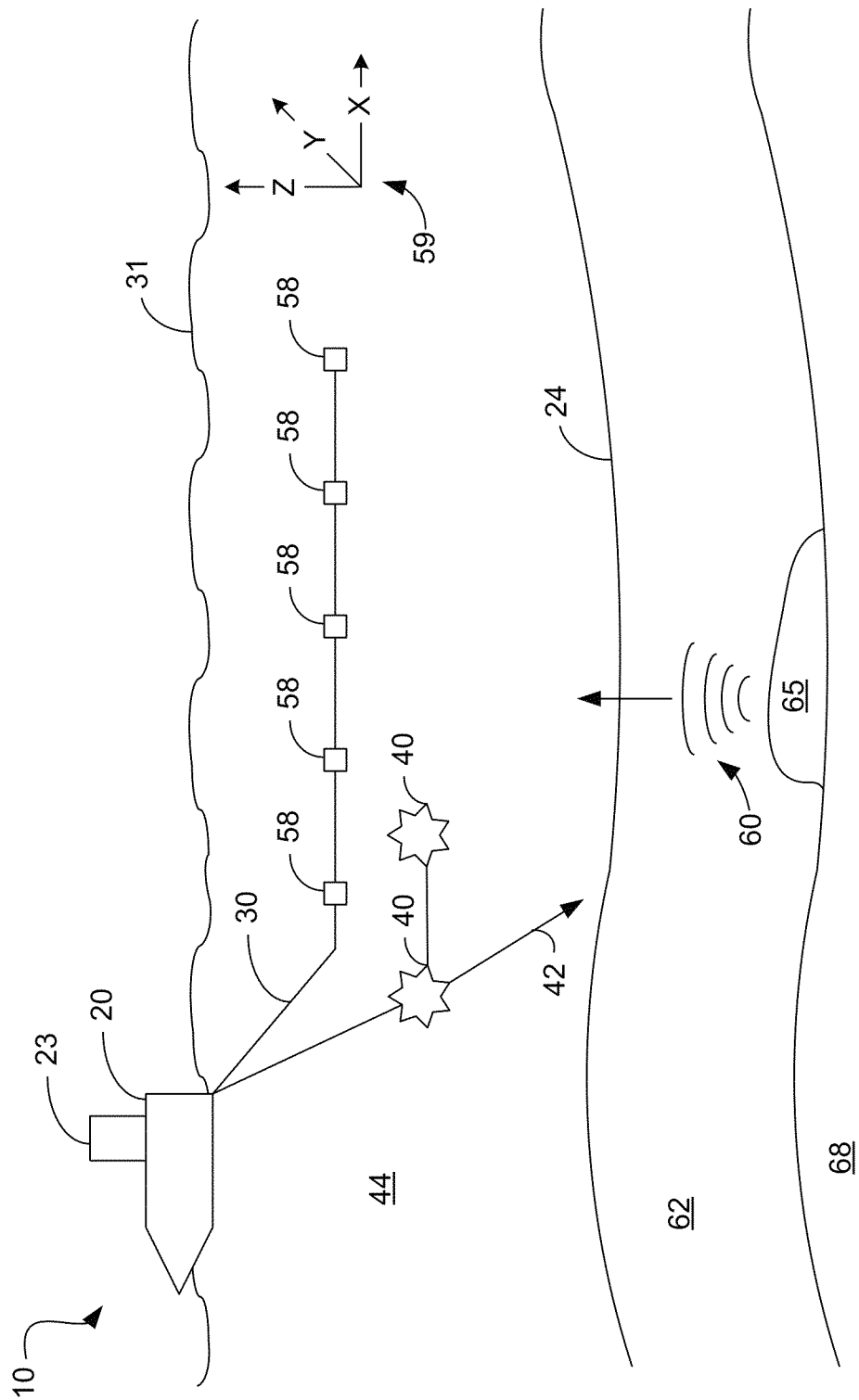
FIG. 1 illustrates a schematic diagram of a marine-based seismic acquisition system in accordance with implementations of various techniques described herein.

FIG. 1 illustrates a schematic diagram of a marine-based seismic acquisition system 10 in accordance with implementations of various techniques described herein. In system 10, survey vessel 20 tows one or more seismic streamers 30 (one streamer 30 being depicted in FIG. 1) behind the vessel 20. In one implementation, streamers 30 may be arranged in a spread in which multiple streamers 30 are towed in approximately the same plane at the same depth. In another implementation, the streamers may be towed at multiple depths, such as in an over/under configuration.

Seismic streamers 30 may be several thousand meters long and may contain various support cables, as well as wiring and/or circuitry that may be used to facilitate communication along the streamers 30. In general, each streamer 30 may include a primary cable where seismic sensors 58 that record seismic signals may be mounted. In one implementation, seismic sensors 58 may include particle motion sensors capable of detecting at least one component of a particle motion associated with acoustic signals that are proximate to the sensor. Examples of particle motions include one or more components of a particle displacement, one or more components (i.e., inline (x), crossline (y) and vertical (z) components (see axes 59)) of a particle velocity and one or more components of a particle acceleration. In another implementation, seismic sensors 58 may include a hydrophone or any other type of sensor that acquires pressure data.

Marine-based seismic data acquisition system 10 may also include one or more seismic sources 40, such as air guns and the like. In one implementation, seismic sources 40 may be coupled to, or towed by, the survey vessel 20. Alternatively, seismic sources 40 may operate independently of the survey vessel 20 in that the sources 40 may be coupled to other vessels or buoys.

A particular seismic source 40 may be part of an array of seismic source elements (such as air guns, for example) that may be arranged in strings (gun strings, for example) of the array. Regardless of the particular composition of the seismic sources, the sources may be fired in a particular time sequence during the survey.

As seismic streamers 30 are towed behind the survey vessel 20, acoustic signals 42, often referred to as "shots," may be produced by seismic sources 40 and are directed down through a water column 44 into strata 62 and 68 beneath a water bottom surface 24. Acoustic signals 42 may be reflected from the various subterranean geological formations, such as geological formation 65 depicted in FIG. 1.

The incident acoustic signals 42 that are generated by seismic sources 40 produce corresponding reflected acoustic signals, or pressure waves 60, which may be sensed by seismic sensors 58. In one implementation, pressure waves received and sensed by seismic sensors 58 may include "up going" pressure waves that propagate to the sensors 58 without reflection, as well as "down going" pressure waves that are produced by reflections of the pressure waves 60 from air-water boundary 31.

Seismic sensors 58 generate signals, called "traces," which indicate the acquired measurements of the pressure wavefield and particle motion. The traces (i.e., seismic data) may be recorded and processed by signal processing unit 23 deployed on the survey vessel 20.

The goal of the seismic acquisition is to build up an image of a survey area for purposes of identifying subterranean geological formations, such as the exemplary geological formation 65. Subsequent analysis of the image may reveal probable locations of hydrocarbon deposits in subterranean geological formations. In one implementation, portions of the analysis of the image may be performed on the seismic survey vessel 20, such as by the signal processing unit 23.

Although FIG. 1 illustrates a marine-based seismic acquisition system, in other implementations, the methods described herein may also be performed on a land-based seismic acquisition system.

Figure 2:
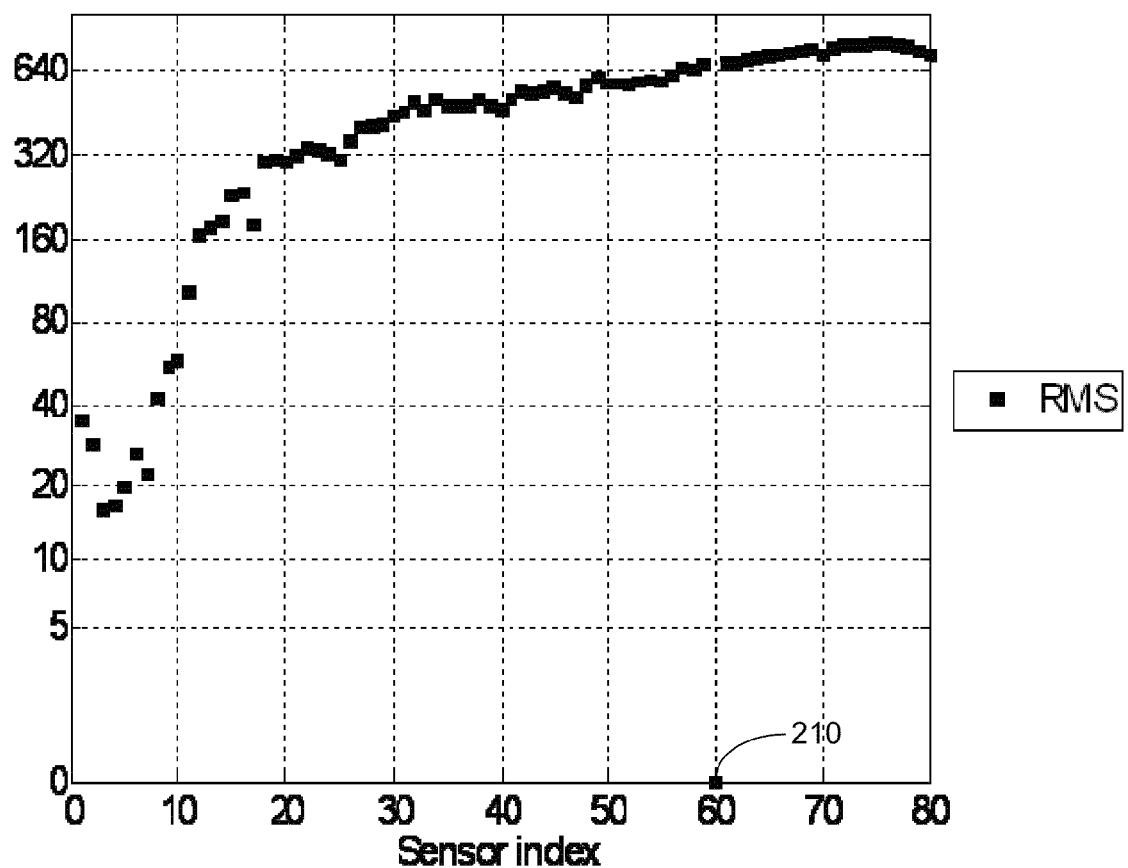
FIG. 2 illustrates a Root Mean Square (RMS) plot of seismic data in accordance with prior art techniques for identifying invalid seismic data.

FIG. 2 illustrates a Root Mean Square (RMS) plot 200 of seismic data in accordance with prior art techniques (i.e., RMS analysis) for identifying invalid seismic data. As mentioned above, some seismic data acquired by sensors 58 may not be valid seismic data because the sensors that acquired the invalid seismic data may have failed or may have been more sensitive to noise than other seismic sensors. A common tool used to identify the failed or noise-sensitive sensors involves determining the root-mean-square (RMS) value of the seismic data acquired by each seismic sensor over a time window (i.e., from time sample $n_1$ to time sample $n_2$) as shown in equation 1 below.

$$\text{RMS}(p_m) = \sqrt{\frac{1}{n_2 - n_1 + 1} \sum_{n=n_1}^{n_2} [p_m(n\Delta T)]^2} \quad \text{Equation 1}$$

In order to identify the failed or noise-sensitive sensors, the RMS value for the seismic data acquired by a particular seismic sensor may be compared with the RMS value for the seismic data acquired by its neighboring seismic sensors. If the RMS value for the seismic data of the particular sensor is too large as compared to the RMS values for the seismic data of the neighboring seismic sensors, the particular sensor may be noise sensitive. If the RMS value for the seismic data of the particular sensor is too small as compared to the RMS values for the seismic data of the neighboring seismic sensors the particular seismic sensor may be dead or weak (i.e., failed).

When the RMS tool is applied to pressure sensors (e.g., hydrophones), the RMS tool may be somewhat useful in identifying the some noise-sensitive sensors and/or dead/weak sensors in the seismic system. However, the RMS tool does not work well with seismic data acquired by particle motion sensors. For instance, particle motion sensors may indirectly measure the displacement of a streamer by measuring changes in particle velocity or particle acceleration caused by the displacement. The streamer may be displaced due to seismic signals from seismic sources, tugging by the vessel and the like. The changes in particle velocity or particle acceleration tend to be very strong at lower ends of the seismic spectrum where ambient noise, seismic interference noise and electronic noise may be prevalent. As such, by performing an RMS analysis on the seismic data acquired by particle motion sensors, the RMS analysis may only indicate the particle motion sensor's sensitivity to cable displacement rather than the particle motion sensor's sensitivity to other types of noise such as high electronic noise.

FIG. 2 provides an example graph of the RMS values of the seismic data acquired by 80 consecutive particle motion sensors in a seismic survey. Of the 80 particle motion sensors, it is known that one of the particle motion sensors is dead and two of the particle motion sensors are extremely sensitive to high electronic noise. By analyzing the RMS plot 200, the dead particle motion sensor is easily identified as sensor #60 because the RMS value 210 of the seismic data acquired by sensor #60 is zero. However, the RMS plot 200 does not indicate which of the particle motion sensors are extremely sensitive to high electronic noise level.

Generally, the RMS tool is restricted to analyzing seismic data in the time domain and does not discriminate the seismic data with respect to frequency. Consequently, due to the spectral characteristics of the particle motion data, the RMS plot 200 cannot indicate which of the particle motion sensors are extremely sensitive to high electronic noise level. In fact, since the RMS analysis tool effectively calculates the average of the seismic data, the RMS tool's calculations may mask the frequency dependent noise with sources or time dependent noise.

Figure 3:
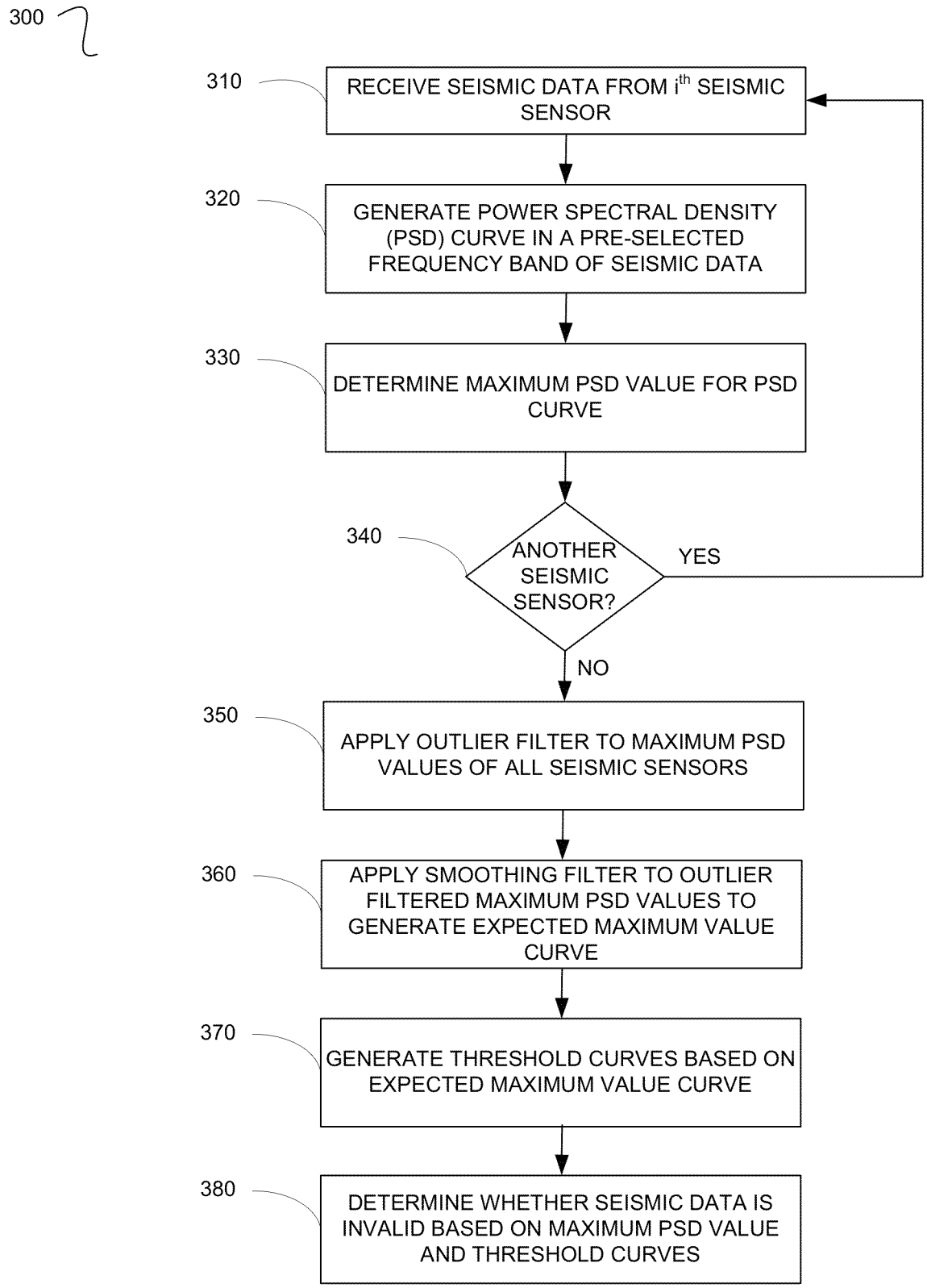
FIG. 3 illustrates a flow diagram of a method for correcting invalid seismic data acquired by problematic seismic sensors in accordance with implementations of various techniques described herein.

FIG. 3 illustrates a flow diagram of a method for correcting invalid seismic data acquired by problematic seismic sensors in accordance with implementations of various techniques described herein. In one implementation, method 300 may be performed by a computer application. It should be understood that while method 300 indicates a particular order of execution of operations, in some implementations, certain portions of the operations might be executed in a different order.

At step 310, the computer application may receive seismic data acquired by a first (i.e., i=1) seismic sensor in a seismic survey. In one implementation, the seismic sensor may be a particle motion sensor in a marine-based seismic acquisition system as described above. However, in other implementations, the seismic sensor may be any type of seismic sensor that may be used in a land-based or marine-based seismic acquisition system. If the seismic sensors are particle motion sensors, method 300 may be performed independently for each component (i.e., x, y and z components) of the seismic data.

At step 320, the computer application may generate a power spectral density (PSD) curve for the seismic data acquired by the first seismic sensor. In one implementation, the computer application may generate the PSD curve by applying a PSD function to the seismic data. The PSD function is a real valued positive function of frequency that describes the average power of a stochastic or deterministic signal per frequency. The power spectral density of a signal $z_m(t)$ (i.e., seismic data) is defined as the Fourier transform of its autocorrelation function:

$$PSD_m(f) = \int_{-\infty}^{\infty} R_m(\tau) e^{-j2\pi f \tau} d\tau \qquad \text{Equation 2}$$

where $R_m(\tau)$ represents the value of the autocorrelation function at lag $\tau$ and $f$, represents the frequency.

Equation 2 above illustrates how the power spectral density of a signal may be measured in an infinite time window. However, various methods may be used to estimate the power spectral density of a signal measured in a finite time window. The methods can be generally classified as parametric and non parametric methods. The parametric methods model the PSD of the signal with a small number of parameters and attempt to estimate these parameters by using the input data. Some examples of parametric models include auto-regressive (AR), moving average (MA), and auto-regressive moving-average (ARMA) models.

Alternatively, the PSD of the signal can be estimated by using non-parametric methods which do not make any assumption about the shape of the spectrum. For instance, parametric methods may assume that the spectrum contains a certain number of peaks and/or nulls. Examples of non-parametric methods include the periodogram, Welch's method and Thompson's multitaper method. Welch's method is based on splitting the time signal into overlapping time segments, tapering each time segment with a window function, and computing the ensemble average of the periodogram of the individual segments. Mathematically, Welch's method is computed as:

$$PSD_m(f) = \frac{\sum_{n=1}^{N} PSD_{m,n}(f)}{N} \qquad \text{Equation 3}$$

where $PSD_{m,n}(f)$ is the periodogram of the tapered time segment $z_m(t)$ and N is the number of time segments. The periodogram estimate of the PSD is computed as magnitude square of Fourier transform of the tapered signal:

$$PSD_{m,n}(f) = \frac{\left| \int_{t_{n1}}^{t_{n2}} w(t) z_{m,n}(t) e^{-j2\pi f t} dt \right|^2}{T_n} \qquad \text{Equation 4}$$

where $t_{n1}$, $t_{n2}$ denote the start and end of the n-th segment; $T_n$ is the duration of the n-th time segment and $w(t)$ is a tapering function.

In one implementation, the computer application may generate the PSD curve by applying the PSD function to the seismic data at various frequencies in a predetermined frequency band. The various frequencies may include predetermined frequency intervals within the predetermined frequency band. In one implementation, the predetermined intervals may be inversely proportional to the window size of the PSD function.

The predetermined frequency band may be determined based on the expected acoustic response of the sensor being evaluated. The expected acoustic response of the sensor may depend on the sensor's type, the sensor's design and the design of the streamer that carries the sensor. The sensor types may be different particle motion sensors such as geophones, accelerometers, pressure sensors and the like. The sensor design may indicate the components used in the sensor. For instance, an accelerometer built using component 'A' may have a different characteristic/response as compared to an accelerometer built using component 'B'. Similarly, the same accelerometer may have a different response if it is used in a streamer of design 'X' than if it is used in a streamer of design 'Y'. As such, the predetermined frequency band may be based on empirical knowledge of the performance of the sensor being evaluated as used in the particular seismic streamer. Listed below are a few examples of how the predetermined frequency band may be selected.

In one implementation, in order to identify sensors that have failed or are no longer working correctly, the predetermined frequency band may be a high frequency band where noise due to seismic sources (e.g., vibrations) won't interfere with the sensor's readings. Noise due to seismic sources won't interfere with the sensor's readings in a high frequency band because this type of noise is typically strongest at low to mid frequencies. In one implementation, the upper limit of the high frequency band may be 80% of the Nyquist frequency. The upper limit of the high frequency band may then be used to determine the range of the high frequency band. For instance, if the upper limit of the high frequency band is 200 Hz, the predetermined frequency band may be 170-190 Hz (i.e., 85%-95% of the upper limit). The frequencies between 190 and 200 Hz may be omitted from the predetermined frequency band to stay away from the cut-off frequency of the anti-aliasing filter, which is typically at 80% of the Nyquist, i.e., 200 Hz.

In another implementation, in order to analyze the orientation of the sensors, the predetermined frequency band may be close to 0 Hz.

In yet another implementation, in order to identify sensors that are sensitive to high electronic noise, the predetermined frequency band may be a high frequency band because high electronic noise may be most prevalent in higher frequencies.

In yet another implementation, in order to identify sensors that have poor sensitivity to seismic data, the predetermined frequency band may include frequencies where the sensors are expected to acquire strong signals (e.g., frequency where upgoing and downgoing wavefields have constructive interference, i.e., pressure notch).

In yet another implementation, in order to identify sensors that that are subject to high energy localized noise, the frequency band may include lower frequencies because the level of the vibration noise will be sensitive to this type of perturbations. In one implementation, the lower frequency band may be determined based on the type of noise or signal energy being detected as a function of frequency. The type of noise or signal energy and its relationship to frequency may be estimated based on empirical data or known characteristics of the same type of noise or signal energy.

In yet another implementation, for particle motion sensors, a PSD curve may be generated for each component (i.e., x, y and z components) of the seismic data. In this case, different frequency bands may be evaluated for each component. For example, higher frequencies (e.g., 170-190 Hz) may be evaluated for the seismic data that correspond to the y and z components, and lower frequencies (e.g., 0-4 Hz) may be evaluated for the seismic data that correspond to the x component.

After generating the PSD curve at various frequencies in the predetermined frequency band, at step 330, the computer application may determine a maximum PSD value of the PSD curve. The computer application may determine the maximum PSD value of the PSD curve in order to characterize the PSD curve into a single value. Although step 330 is described with the computer application determining the maximum PSD value of the PSD curve, in other implementations the computer application may characterize the PSD curve as a single value by examining other characteristics about the PSD curve. For example, the computer application may determine the median or minimum value of the PSD curve as opposed to the maximum value of the PSD curve. In another example, the computer application may perform a quantile statistics analysis to characterize the PSD curve as a single value. The quantile statistics analysis may provide a PSD sample value k such that a certain percentage of the PSD curve values is smaller than k. One representative PSD value may then be extracted with respect to the PSD sample value k and the certain percentage.

At step 340, the computer application may determine whether seismic data acquired by another seismic sensor in the seismic survey is available. If seismic data acquired by another seismic sensor in the seismic survey is available, the computer application may repeat steps 310-330 for the seismic data acquired by the corresponding seismic sensor. In this manner, the computer application may repeat steps 310-330 until a maximum PSD value is determined for the seismic data acquired by each seismic sensor in the seismic survey. After repeating steps 310-330 for the seismic data acquired by each seismic sensor, the computer application may plot each maximum PSD value (i.e., collection of maximum PSD values) on a graph as illustrated by reference 410 in FIG. 4. The collection of maximum PSD values illustrated in FIG. 4 consist of the maximum PSD values of 80 consecutive particle motion sensors. In one implementation, the computer application may store the collection of maximum PSD values in a memory storage device and proceed to step 350.

At step 350, the computer application may apply an outlier filter to the collection of maximum PSD values. The outlier filter may remove certain maximum PSD values from the collection of maximum PSD values based on how much they deviate from a relative distribution of the maximum PSD values in the collection of maximum PSD values. In one implementation, the outlier filter may be a median filter that replaces each maximum PSD value with the median of the maximum PSD values around it. In another implementation, the outlier filter may be an α-trimmed mean filter.

Figure 4:
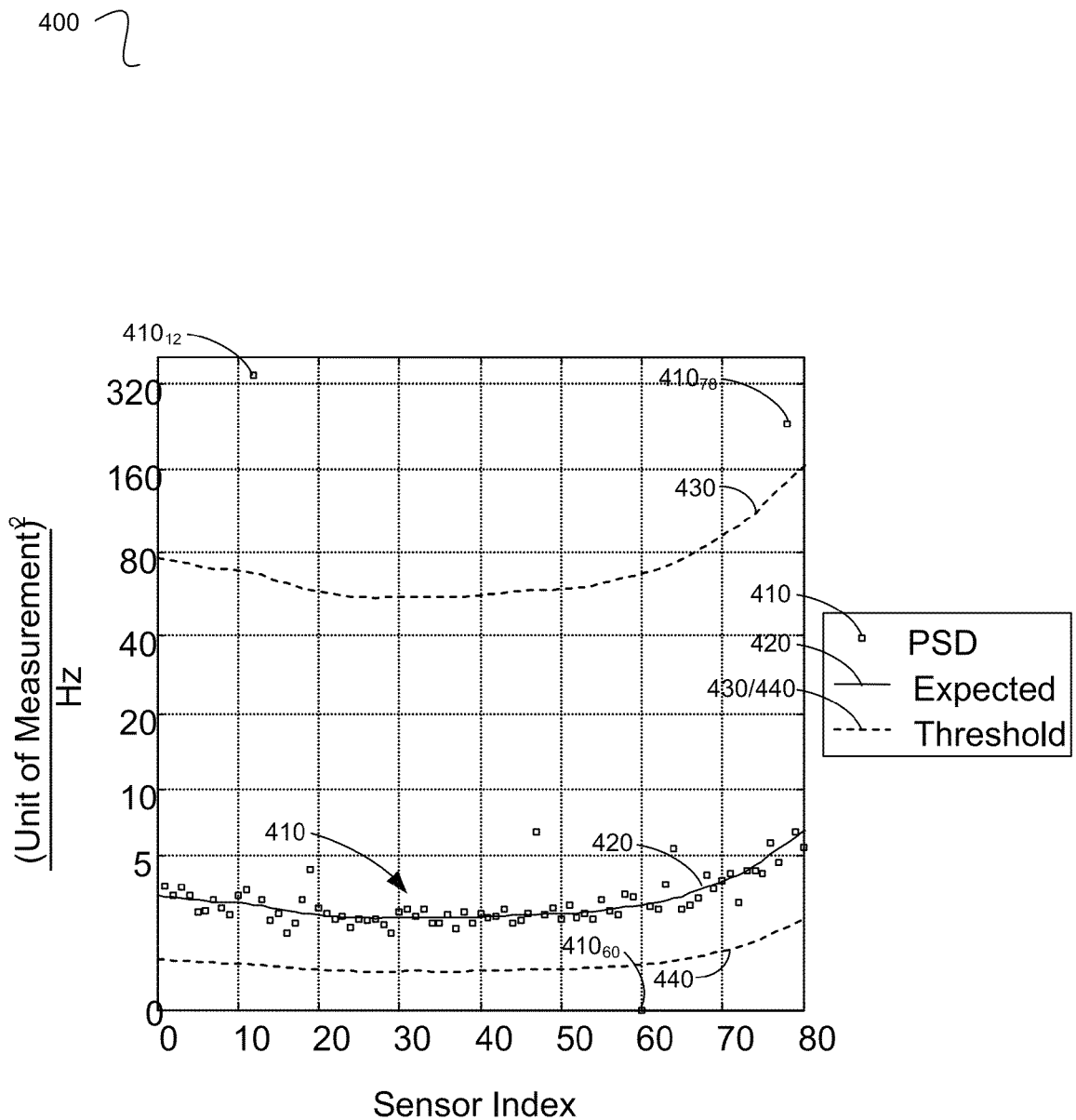
FIG. 4 illustrates a Power Spectral Density (PSD) analysis of seismic data in accordance with implementations of various techniques described herein.

At step 360, the computer application may apply a smoothing filter to the outlier filtered collection of maximum PSD values determined at step 350. The smoothing filter may be configured to create an expected maximum PSD value curve for each seismic sensor in the seismic survey. The expected maximum PSD value curve for maximum PSD values (reference 410) in FIG. 4 is illustrated by curve 420. In one implementation, the smoothing filter may be a spatial smoothing filter.

At step 370, the computer application may generate threshold curves based on expected maximum value curve. In one implementation, the computer application may generate an upper threshold curve by multiplying the expected maximum value curve by a predefined constant (i.e., A) such that the predefined constant A is greater than 1 (e.g., 1.1, 1.2, 1.3). Predefined constant A may be a constant value based on an analysis of typical particle motion data. In one implementation, predefined constant A may be defined such that the maximum PSD values are fit according to a typical distribution of maximum PSD values for seismic sensors. The upper threshold curve is illustrated in FIG. 4 with curve 430.

The computer application may generate a lower threshold curve by multiplying the expected maximum value curve by a different predefined constant (i.e., B) such that the predefined constant B is less than 1 (e.g., 0.7, 0.8, 0.9). Like predefined constant A, predefined constant B may be a constant value based on an analysis of typical particle motion data. In one implementation, predefined constant B may also be defined such that the maximum PSD values are fit according to a typical distribution of maximum PSD values for seismic sensors. The lower threshold curve is illustrated in FIG. 4 with curve 440.

At step 380, the computer application may determine whether seismic data acquired by each seismic sensor is noisy or dead/weak (i.e., invalid). In one implementation, the computer application may compare the maximum PSD value 410 that corresponds to each seismic sensor to the upper and lower threshold curves (430, 440) to determine whether seismic data acquired by each seismic sensor is noisy or dead/weak. If a maximum PSD value is greater than the upper threshold, then the seismic sensor that corresponds to that maximum PSD value may be characterized as noisy. For example, the maximum PSD value that corresponds to sensor 12 (i.e., 410$_{12}$) and the maximum PSD value that corresponds to sensor 78 (i.e., 410$_{78}$) exceed the upper threshold curve 430. In this case, the computer application may determine that the seismic data acquired by sensor 12 and sensor 78 have very high electronic noise and are therefore invalid.

If a maximum PSD value is less than the lower threshold, then the seismic data that corresponds to that maximum PSD value may be characterized as dead or weak. For example, the maximum PSD value that corresponds to sensor 60 (i.e., 410$_{60}$) is less than the lower threshold curve 440. In this case, the computer application may determine that sensor 60 is dead or weak, and therefore its corresponding seismic data, invalid.

Referring back to example described above, for particle motion sensors, the computer application may evaluate each component of the seismic data to determine whether the seismic data is invalid. In this case, the computer application may identify invalid seismic sensors when the maximum PSD value for one of the components lies outside the upper or lower threshold curves.

After identifying the invalid seismic sensors, the computer application may mute the seismic data that corresponds to the identified sensors and interpolate new seismic data to replace the muted seismic data. The new seismic data may be interpolated based on the seismic data acquired by valid seismic sensors that are near or adjacent to the invalid seismic sensors. In this manner, the computer application may correct for the invalid seismic data in the seismic data received at step 310. The computer application may then process the seismic data to determine the shape, position and composition of the subterranean formations in the earth.

Mathematical Example

Described below is some of the mathematics that enables method 300. It should be understood that the example described below is provided to help describe one implementation of method 300 and is not intended to limit the use of method 300.

At step 320, to compute the PSD of the acquired data at a frequency band [$f_1, f_Q$], the continuous time data may be represented as $z_m(t, ch)$, where t is time and ch is the sensor channel index. The uniformly spaced time samples of the data may be represented as $z_m(n\Delta t, ch)$, n=1, 2, K, N. Here $\Delta t$ is the sampling interval and N is the number of time samples in a shot.

Typically, the PSD may be computed at a discrete set of frequencies $f = f_1, f_2, K, f_Q$ (i.e., predetermined frequency intervals) in the frequency band [$f_1, f_Q$] (i.e., predetermined frequency band). For instance, for y and z components of particle motion sensors, the PSD may be computed at frequency band [170, 190] Hz and at Q=5 distinct frequencies: 170 Hz, 175 Hz, 180 Hz, 185 Hz, and 190 Hz. When the PSD is to be computed at the higher end of the spectrum, it is advisable to estimate the PSD from a difference signal to avoid the side-lobes of the strong low frequency noise mask the spectrum of the weaker high frequency noise. A variable d may represent the difference operator to be used. For instance, d=2 corresponds to second difference, d=1 corresponds to first difference, and d=0 corresponds to no difference. Typically, when the PSD is computed at high frequencies, d=1, and when the PSD is computed at lower frequencies, d=0. Mathematically, the difference signal is computed as follows:

$$z_{md}(n\Delta t, ch) = z_m(n\Delta t, ch), d=0$$

$$z_{md}(n\Delta t, ch) = z_m(n\Delta t, ch) - z_m((n-1)\Delta t, ch), d=1$$

$$z_{md}(n\Delta t, ch) = z_m(n\Delta t, ch) - 2z_m((n-1)\Delta t, ch) + z_m((n-2)\Delta t, ch), d=2$$

The difference signal may be split into L-sample non-overlapping segments;

$$z_{mds}(t; ch, s) = z_{md}(t+sL, ch)$$

$$t=1,2,K,L$$

$$s=1,2,K,N_s$$

and each segment $z_{mds}(t; ch, s)$ into $L/L_s$-sample non-overlapping segments:

$$z_{mdsr}(t; ch, s, r) = z_{mds}(t+rL/L_s; ch, s)$$

$$t=1,2,K,L$$

$$r=1,2,K,L_s$$

In one implementation, the length of a segment is L=256, the total number of segments is Ns=[[(nt−d)/L]], where the operator [[ ]] gives the integer part of its argument; the number of sub-segments is $L_s$=8, and the length of a sub-segment is $L/L_s$=32 samples.

The PSD of each segment may then be averaged using the Periodogram method (or Welch's method with overlapping set to 0).

$$PSD_{zms}(f_q; s, ch) = \frac{\sum_{r=1}^{L} \left| \sum_{n=1}^{L/L} w(t) z_{mds}(n\Delta t; r, s, ch) e^{-j2\pi f_q (t-1)\Delta t} \right|^2}{\left| \sum_{n=1}^{L/L} w(n) \right|^2 4^d L_s / \Delta t}$$

The variable w(n) denotes a window function which is used to taper the sub-segment. In this implementation, the window is chosen as the Hamming window. The denominator of the PSD expression is a scaling factor to have the correct physical unit, e.g., mg$^2$/Hz when the $z_m$ is the measured accelerometer data with unit mg.

In one implementation, the PSD of the noise only portion of the shot may be computed. As such, the PSD of the noise only portion of the shot may be estimated by computing the $N_{sp}$-percentile of the computed PSDs of the $N_s$ segments. For instance, if the shot is long enough such that the noise only portion of the shot is 25% percent or longer of the whole shot, then $N_{sp}$ can be chosen as 25. It is to be noted that the 25-th percentile is known as the first quartile and the 50-th percentile is known as the median.

The $N_{sp}$-percentile may be computed by sorting the PSD values for each segment from smallest to the largest, and then picking a value $PSD_{zm}(f_q; ch)$ such that $N_{sp}$ percent of the segments have a PSD value $PSD_{zms}(f_q; s, ch)$ below the picked value.

At step 330, a maximum PSD value may be determined for each channel. The maximum value of the PSD in the frequency band [$f_1, f_Q$] may be computed as:

$$MPSD(ch) = \max([PSD(f_1; ch), PSD(f_2; ch), K, PSD(f_Q; ch)])$$

As such, one maximum PSD (MPSD) value may be acquired per channel.

At steps 350-360, the expected value attribute for each channel EPSD(ch) may be estimated. In one implementation, the expected value attribute may be computed in two steps. First, a 7-point median filter is applied on MPSD values over each channel to remove outliers. Second, a weighted average of the median filtered MPSD values is computed by using a 13-point FIR filter.

At steps 370-380, two conditions may be tested to identify weak and noisy traces. If the following condition is true, then the corresponding trace from the channel ch is characterized as noisy:

$$MPSD(ch) > A*EPSD(ch)$$

Alternatively, if the following condition holds, then the corresponding trace from the channel ch is characterized as weak:

$$MPSD(ch) < B*EPSD(ch)$$

A and B are predetermined constants used to determine two threshold values which can be chosen as A=10 and B=0.1 for y and z components.

Figure 5:
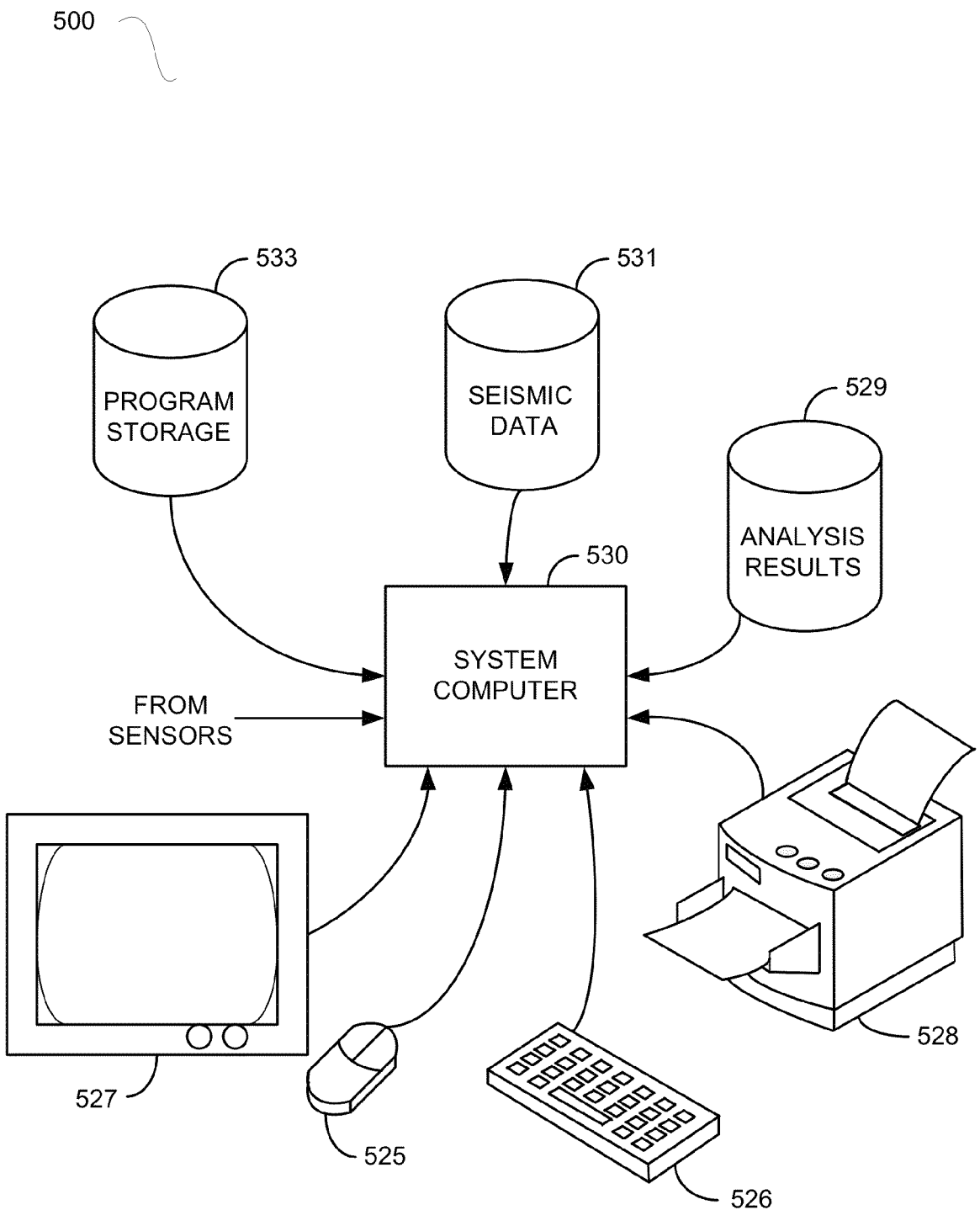
FIG. 5 illustrates a computer network into which implementations of various technologies described herein may be implemented.

FIG. 5 illustrates a computer network 500, into which implementations of various technologies described herein may be implemented. In one implementation, various techniques for correcting invalid seismic data acquired by problematic seismic sensors as described in FIG. 3 may be performed using the computer network 500. The computer network 500 may include a system computer 530, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, mini-computers, mainframe computers, high-performance clusters of computers, co-processing-based systems (GPUs, FPGAs) and the like.

The system computer 530 is in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one implementation, seismic data from hydrophones are stored in disk storage device 531. The system computer 530 may retrieve the appropriate data from the disk storage device 531 to process seismic data according to program instructions that correspond to the implementations of various technologies described herein. The program instructions may be written in a computer programming language, such as C++, Java and the like. The program instructions may be stored in a computer-readable memory, such as program disk storage device 533. Such computer-readable media may include computer storage media and communication media.

Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 500.

Communication media may embody computer readable instructions, data structures or other program modules. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 530 may present output primarily onto graphics display 527. The system computer 530 may store the results of the methods described above on disk storage 529, for later use and further analysis. The keyboard 526, the pointing device (e.g., a mouse, trackball, or the like) 525 and the printer 528 may be provided with the system computer 530 to enable interactive operation.

The system computer 530 may be located at a data center remote from the survey region. The system computer 530 is in communication with sensors such as particle motion sensors or hydrophones (either directly or via a recording unit, not shown), to receive signals indicative of the reflected seismic energy. After conventional formatting and other initial processing, these signals may be stored by the system computer 530 as digital data in the disk storage 531 for subsequent retrieval and processing in the manner described above. In one implementation, these signals and data may be sent to the system computer 530 directly from sensors, such as particle motion sensors, geophones, hydrophones and the like. When receiving data directly from the sensors, the system computer 530 may be described as part of an in-field data processing system. In another implementation, the system computer 530 may process seismic data already stored in the disk storage 531. When processing data stored in the disk storage 531, the system computer 530 may be described as part of a remote data processing center, separate from data acquisition. The system computer 530 may be configured to process data as part of the in-field data processing system, the remote data processing system or a combination thereof.

While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
   (a) receiving seismic data acquired by an $i^{th}$ seismic sensor of a plurality of seismic sensors;
   (b) determining an $i^{th}$ value to represent an $i^{th}$ power spectral density curve that corresponds to the seismic data;
   (c) repeating steps (a)-(b) for each seismic sensor;
   (d) generating an expected value curve, using a computer, based on the $i^{th}$ value for each power spectral density curve;
   (e) comparing each $i^{th}$ value to the expected value curve;
   (f) identifying invalid seismic sensors based on the comparison; and
   (g) processing the seismic data without seismic data acquired by the invalid seismic sensors to determine one or more locations of hydrocarbon deposits in subterranean geological formations.

2. The method of claim 1, wherein the plurality of seismic sensors comprise particle motion sensors.

3. The method of claim 1, wherein the plurality of seismic sensors comprise hydrophone sensors.

4. The method of claim 1, further comprising generating the $i^{th}$ value for each power spectral density curve.

5. The method of claim 4, wherein the $i^{th}$ power spectral density curve is generated by applying a power spectral density function to the seismic data acquired by the $i^{th}$ seismic sensor at one or more frequencies in a predetermined frequency band.

6. The method of claim 4, wherein each frequency is separated by a predetermined interval that is inversely proportional to a window size of the power spectral density function.

7. The method of claim 4, wherein the predetermined frequency band is based on an expected acoustic response of the plurality of seismic sensors, a design of the plurality of seismic sensors, a design of a streamer that carries the plurality of seismic sensors, or combinations thereof.

8. The method of claim 4, wherein the predetermined frequency band is a high frequency band for identifying one or more seismic sensors that have failed or are sensitive to high electronic noise.

9. The method of claim 4, wherein the predetermined frequency band is a low frequency band for identifying one or more seismic sensors that are subject to high energy localized noise.

10. The method of claim 9, wherein the low frequency band is determined based on empirical data that indicates a plurality of frequencies where the high energy localized noise is located.

11. The method of claim 4, wherein the predetermined frequency band correspond to one or more frequencies wherein the $i^{th}$ seismic sensor is expected to acquire seismic signals where upgoing and downgoing wavefields have constructive interference.

12. The method of claim 1, wherein the $i^{th}$ value is a maximum power spectral density (PSD) value, a minimum PSD value or a median PSD value.

13. The method of claim 1, wherein the $i^{th}$ value is determined by performing a quantile statistics analysis on the $i^{th}$ power spectral density curve.

14. The method of claim 1, wherein generating the expected value curve comprises:
   applying an outlier filter to a collection of $i^{th}$ values that correspond to the plurality of seismic sensors; and
   applying a smoothing filter to the collection.

15. The method of claim 14, wherein applying the outlier filter comprises removing one or more $i^{th}$ values from the collection that deviate more than a predetermined amount from a relative distribution of the collection.

16. The method of claim 14, wherein the outlier filter is a median filter or an α-trimmed mean filter.

17. The method of claim 14, wherein the smoothing filter is a spatial smoothing filter.

18. The method of claim 1, wherein identifying the invalid seismic sensors comprise:
   determining an upper threshold curve;
   determining a lower threshold curve; and
   determining that the $i^{th}$ seismic sensor is invalid if the $i^{th}$ value exceeds the upper threshold curve or falls below the lower threshold curve.

19. The method of claim 18, wherein the upper threshold curve is determined by multiplying the expected value curve by a predefined constant greater than 1.

20. The method of claim 18, wherein the lower threshold curve is determined curve by multiplying the expected value curve by a predefined constant less than 1.

21. The method of claim 18, wherein the $i^{th}$ seismic sensor is considered as noisy if the $i^{th}$ value exceeds the upper threshold curve.

22. The method of claim 18, wherein the $i^{th}$ seismic sensor is considered as dead or weak if the $i^{th}$ value falls below the lower threshold curve.

23. The method of claim 1, further comprising:
   muting the seismic data acquired by the invalid seismic sensors;
   creating a new set of seismic data based on a subset of the seismic data that have $i^{th}$ values between the upper threshold curve and the lower threshold curve; and
   replacing the muted seismic data with the new set of seismic data.

24. A computer system, comprising:
   a processor; and
   a memory comprising program instructions executable by the processor to:
   (a) receive seismic data acquired by an $i^{th}$ seismic sensor of a plurality of seismic sensors;
   (b) determine an $i^{th}$ value to represent an $i^{th}$ power spectral density curve that corresponds to the seismic data;
   (c) repeat steps (a)-(b) for each seismic sensor;
   (d) generate an expected value curve based on the $i^{th}$ value for each power spectral density curve;
   (e) compare each $i^{th}$ value to the expected value curve;
   (f) identify invalid seismic sensors based on the comparison; and
   (g) process the seismic data without seismic data acquired by the invalid seismic sensors to determine one or more locations of hydrocarbon deposits in subterranean geological formations.

* * * * *